Patented June 22, 1948

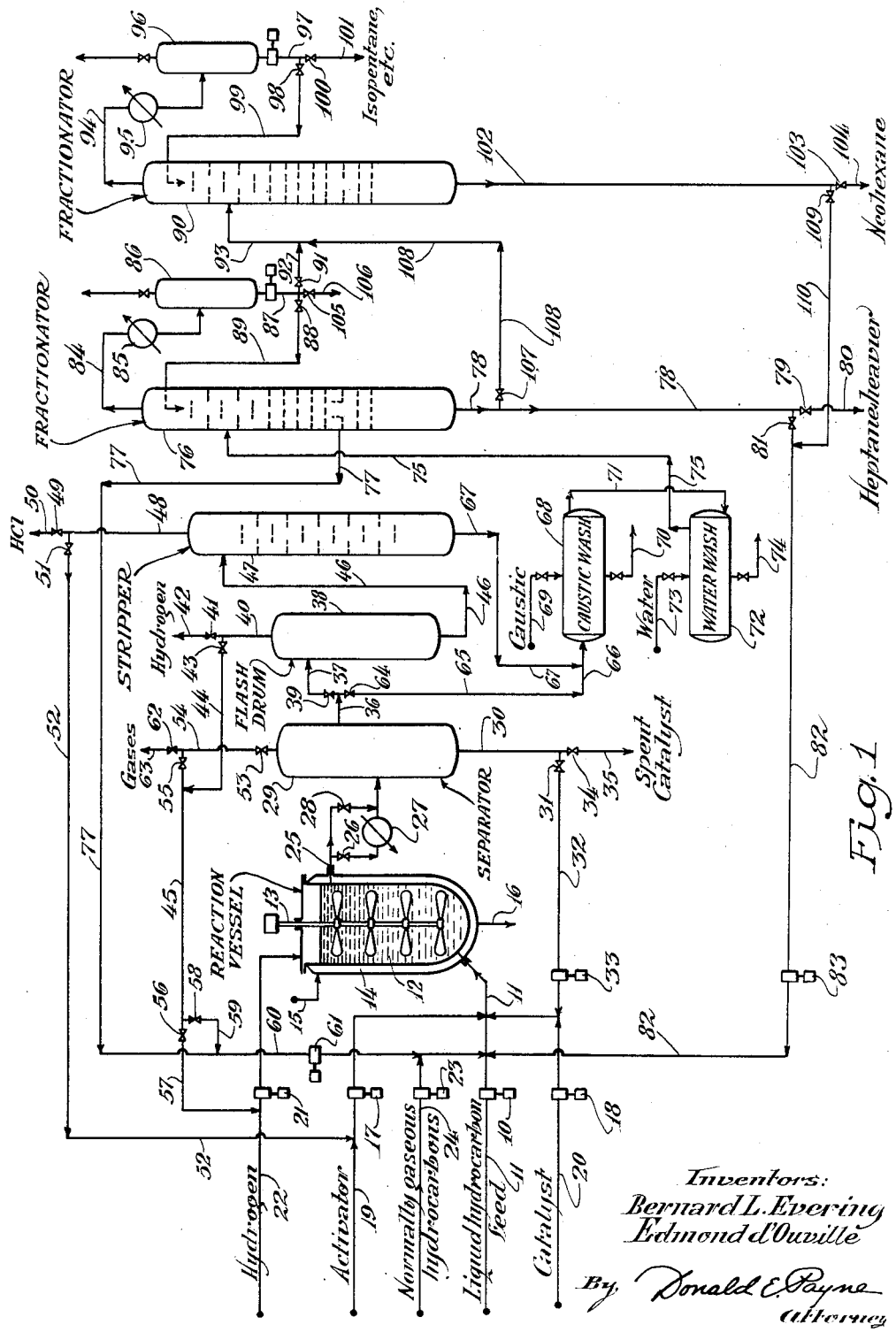

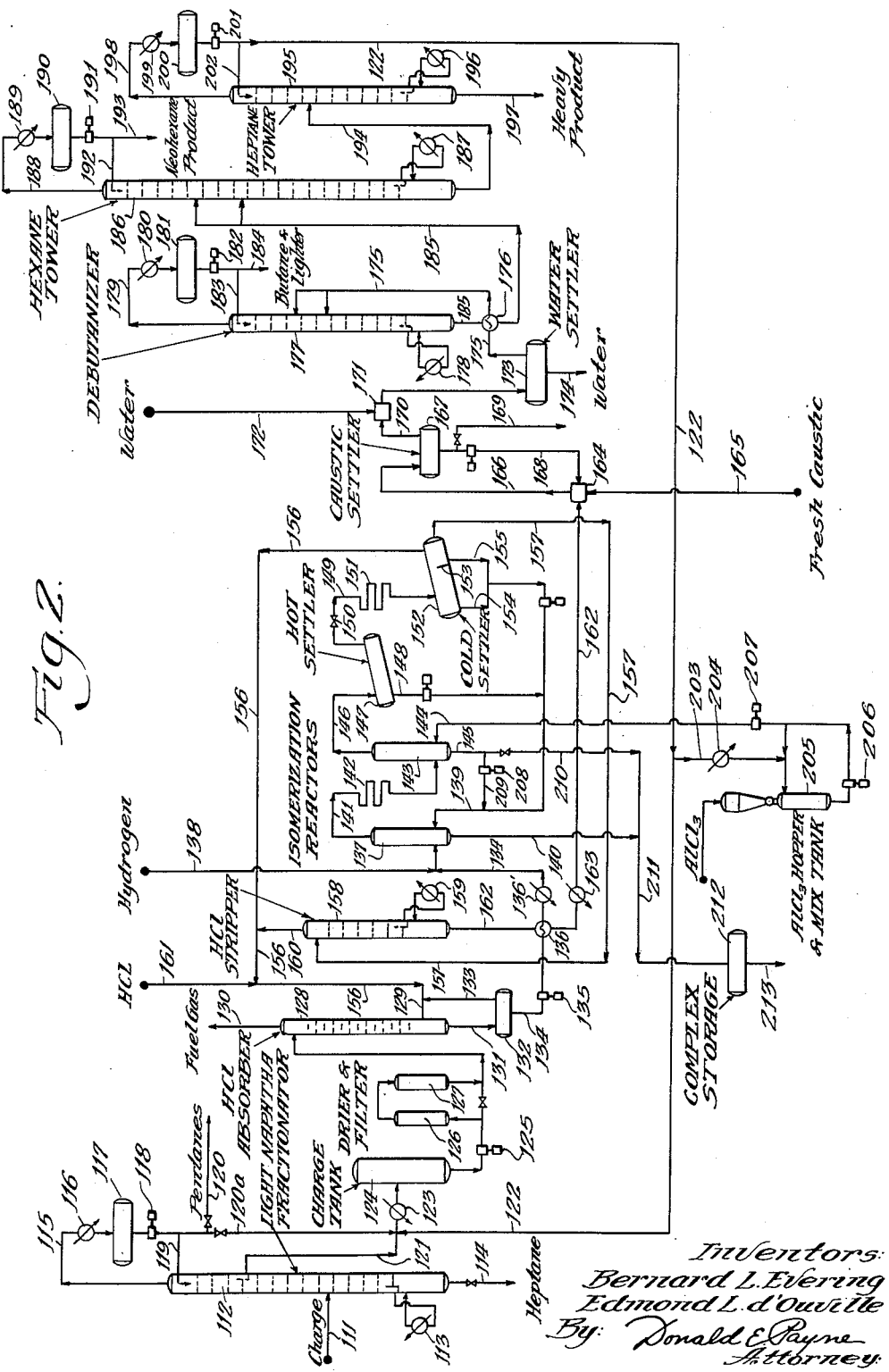

2,443,608

UNITED STATES PATENT OFFICE 2,443,608

PRODUCTION OF NEOHEXANE

Bernard L. Evering, Chicago, Ill., and Edmond L. d'Ouville, Pittsburgh, Pa., assignors to Standard Oil Company, Chicago, Ill., a corporation of Indiana Application February 18, 1944, Serial No. 522,938

10 Claims. (Cl. 260—683.5)

This invention relates to the isomerization of light normally liquid paraffinic hydrocarbons and it pertains more particularly to the conversion of hexane and methyl pentanes to neohexane. This application is a continuation-in-part of our copending applications 365,926, filed November 16, 1940, now abandoned; 422,986, filed December 15, 1941, and 308,480, filed December 9, 1939, the latter being a continuation-in-part of our still earlier application 245,570, filed December 14, 1938 (now U. S. Patent 2,266,012).

Neohexane (2,2-dimethyl butane) is a valuable hydrocarbon for aviation fuel because of its high octane number, high susceptibility to lead tetraethyl, desirable volatility, high heat content per unit weight of fuel, and freedom from gum forming tendencies. An object of our invention is to provide an improved method and means for economically producing neohexane on a commercial basis. Another object is to provide a process for the production of hydrocarbon fractions rich in neohexane with high yields per unit of catalyst consumed. A further object is to provide an improved process for the conversion from normally liquid saturated hydrocarbons such as predominantly paraffinic naphthas, into branched-chain hexanes, particularly neohexane, and for the recovery of aviation fuels or blending stocks consisting predominantly of neohexane from the products of said conversion. Other objects will be apparent as the detailed description of the invention proceeds.

We have found that excellent yields of highly branched-chain saturated hydrocarbons, such as neohexane, can be obtained from normally liquid paraffinic hydrocarbons such as normal hexane and methyl pentanes by subjecting them to the action of an aluminum halide catalyst, an example of which is an aluminum chloride-hydrocarbon complex containing in its composition about 16% to 40% of hydrocarbon, about 50% to 73% of aluminum chloride, the balance consisting essentially of hydrogen chloride and small amounts of iron chloride or other impurities. The conversion is effected at a temperature within the approximate range of 100 to 400° F. and preferably within the approximate range of 200° to 300° F., for example approximately 250° F. under a pressure sufficient to maintain substantially liquid phase conversion conditions, i. e. a pressure within the approximate range of 50 to 3000 pounds per square inch, preferably within the approximate range of 250 to 1500 pounds per square inch, for example in the general vicinity of about 850 pounds per square inch. Hydrogen greatly retards the rate of deactivation of the catalyst and enables the production of especially high yields of the desired products per unit weight of catalyst, thus reducing catalyst costs so that the process is economically attractive. Hydrogen may be used in amounts within the approximate range of 50 to 300 cubic feet per barrel of hydrocarbon stock charged, preferably within the approximate range of 180 to 200 cubic feet per barrel of stock charged. The optimum space velocity will depend somewhat upon the temperature employed. At 200° F. the space velocity should be within the approximate range of .07 to 1.4, at 250° F. from .23 to 4.6, at 300° F. from .7 to 14, and at 330° F. from 1.4 to 27 volumes of charging stock per hour per volume of complex in the reactors. Under preferred operating conditions the optimum space velocity is thus about 1.4 volumes of stock charged to the reactors per hour per volume of complex in the reactors. Hydrogen halide is introduced to the reactors along with the stock charged in amounts within the approximate range of 2 to 20%, preferably within the approximate range of 3 to 8%, for example 5%, by weight based on stock charged. In order to maintain the activity of the catalyst and to keep its composition within the optimum range fresh aluminum chloride is added as make-up in amounts within the approximate range of .1 to 2% and preferably within the approximate range of .2 to 1%, for example about .5% by weight based on the stock charged.

Our charging stock may be any substantially saturated normally liquid hydrocarbon fraction rich in straight-chain or slightly branched-chain paraffins boiling below heptane and above pentane providing said charge is substantially free from olefins and free from excessive amounts of aromatic hydrocarbons. Our preferred feed stock contains less than 5% and preferably 0.5 to 1.0% or less of aromatic hydrocarbons. The charge may be a relatively pure normally liquid low octane number paraffinic hydrocarbon such as normal hexane or 2-methyl pentane, but generally predominantly paraffinic straight run naphthas of suitable boiling range, such as those from Michigan, Pennsylvania or Mid-Continent crude oil, are preferred since they are much more readily available. Natural gasoline and so-called "distillate" fractions are also suitable and are plentiful and inexpensive in some production areas. Hexane and methyl pentanes obtained by the hydrogenation of carbonaceous materials or by the carbon monoxide-hydrogen synthesis are excellent charging stocks for our process.

Since the conversion of paraffinic hydrocarbons of low antiknock value into much more useful highly branched-chain paraffinic hydrocarbons, such as neohexane, is the desired reaction, it is preferred to use a feed stock containing a relatively small proportion of naphthenes. The feed stock for our process therefore preferably contains at least 50% of normal or slightly branched-chain paraffinic hydrocarbons and stocks containing at least 80% of such paraffinic hydrocarbons are especially desirable. The hexane cut of most paraffinic naphthas will contain appreciable amounts of naphthenes and under reaction conditions these naphthenes may be isomerized and methylated, methyl cyclopentane being converted, for example, to cyclohexane and cyclohexane in turn being converted into methyl cyclohexane, dimethyl cyclohexane, etc. It is important that such naphthenes should not be allowed to build up in the system and for optimum conversion the naphthene content of the charging stock entering reactors should be within the approximate range of 2 to 20%, preferably 5 to 15%, for example about 10%. A particularly suitable naphtha feed is one prepared by the distillation and fractionation of a straight run or natural gasoline stock to produce a light naphtha having an initial boiling point in the range from about 30° to 110° F. and an end point within the approximate range of about 145 to 180° F., preferably in the general vicinity of 158° F. In other words, the charging stock should be lower boiling than heptane and it should consist chiefly of normal hexane and methyl pentanes along with small amounts of naphthenes. Pentanes and butanes may likewise be included in the charge since under conversion conditions normal pentane, for example, is converted largely to isopentane.

An important feature of our invention is the preparation and fractionation of the original charging stock, the close fractionation of the product stream, the elimination of heptanes and higher boiling hydrocarbons from the product stream and the recycling of large quantities of hexane and methyl pentanes. In a once-through operation only about 20 to 30% of the hexanes in the product stream is neohexane, the bulk of such hexanes being methyl pentanes and normal hexane (2,3-dimethyl butane usually being present in the smallest amounts of all). In order to obtain a fraction consisting chiefly of neohexane it is therefore necessary that the methyl pentanes and normal hexane be recycled to the conversion step. With very close or superfractionation and extensive recycling, neohexane of a high degree of purity can be produced, the presence of small amounts of 2,3-dimethyl butane being unobjectionable because this hydrocarbon is practically as valuable as neohexane in aviation fuels and blending stocks. Usually a product fraction containing upwards of 50% for example about 60 to 80% of neohexane is most advantageous and although this product may as above stated contain 2,3-dimethylbutane and small amounts of methyl pentanes it is commonly referred to as neohexane. The term "neohexane" as used in the accompanying claims is hereby defined to include such compositions.

The aluminum halide catalyst used in carrying out our process can be prepared from aluminum chloride or aluminum bromide in anhydrous form and it is preferably introduced into the reaction zone in the form of a slurry, paste or solution, for instance in a portion of the fresh feed stock or the recycled portion of the feed stock. A particularly good catalyst is a liquid complex formed by the action of aluminum chloride and hydrogen chloride on a highly branched paraffinic hydrocarbon such as iso-octane or on a portion of the charging stock itself. In order to maintain a rapid rate of reaction the aluminum chloride content of the complex should be at least 50% and preferably about 60 to 70%. If the aluminum chloride content exceeds above 73 or 75% however there is a considerable tendency for the charging stock stream to dissolve aluminum chloride from the complex and to carry over this dissolved aluminum chloride into subsequent parts of the system. To avoid or minimize such catalyst carry-over we therefore maintain the aluminum chloride content of the complex below 75% and preferably below 73%. In order to avoid corrosion difficulties inherent to the use of such complex catalyst in the presence of added hydrogen halide or equivalent activator it is preferred that the reaction vessels be lined with Hastelloy or other noncorrosive metal alloy or with non-ferrous materials such as glass, ceramic substances or other corrosion-proof coatings known to the art. The presence of aluminum is not deleterious and may in fact be advantageous.

Our invention will be more clearly understood from the detailed descriptions of specific embodiments thereof read in conjunction with the accompanying drawings which form a part of the specification and in which Figure 1 is a schematic flow diagram of a system employing a stirred reactor and Figure 2 is a schematic flow diagram of a current commercial unit employing tower type reactors.

Referring to Figure 1, the normally liquid feed is introduced into the system by means of pump 10 and line 11 and thence into the lower portion of the reaction vessel 12 which is shown as a jacketed pressure vessel equipped with a stirring device 13 so that the reaction materials are thoroughly contacted. The desired reaction temperature is maintained by passing a suitable gaseous or liquid heating agent through the jacket 14 of reaction vessel 12 by means of inlet 15 and outlet 16. Activator and catalyst slurry are introduced into line 11 and mixed with the feed therein by means of pumps 17 and 18 and lines 19 and 20 respectively. If desired the activator can be absorbed under pressure in the feed stock prior to the introduction of catalyst. Free hydrogen is supplied to the upper portion of reaction vessel 12 through pump 21 and line 22, and is there maintained at the desired reaction pressure, which is sufficiently high to cause the hydrogen to dissolve in the agitated reaction mixture at a rate at least as great as it is used up in the reaction. Obviously if desired a number of reaction vessels can be used in series or parallel in place of the one shown, or vessels of other types well-known in the art can be substituted therefor. Normally gaseous hydrocarbons, such as n-butane and/or isobutane, can be introduced, if desired, through pump 23 in line 24.

A portion of the entire reaction mixture is continuously withdrawn from the upper portion of vessel 12 through line 25 and passed either thru valve 26 and cooler 27 or thru by-pass valve 28 or partly thru each valve into separator 29. The products consist of a catalyst complex which settles out in the lower portion of separator 29, and an upper layer consisting of a mixture of hydrocarbons containing branched-chain paraffins having from four to eight or more carbon atoms per molecule, unreacted feed stock, dissolved hydrogen and hydrogen chloride. The catalyst complex is continuously withdrawn from separator 29 thru line 30 and either recycled to line 20 thru valve 31, line 32 and pump 33 or withdrawn from the system thru valve 34 and line 35, or under some conditions a portion of the complex may be continuously withdrawn from the system and the remainder recycled. Substantially spent complex can, of course, be regenerated to a more active complex or the aluminum halide may be recovered therefrom and reintroduced into the system through pump 18. Furthermore at least a portion of the spent complex can be treated with water or otherwise to furnish hydrogen halide for use as an activator in the process.

The upper layer is removed from separator 29 through line 36 and passes via line 37 to hydrogen flash drum 38. Valve 39 in line 37 is preferably of the pressure reducing type adjusted to the desired pressure. The released hydrogen passes overhead through line 40 and may be discarded by opening valve 41 in line 42, but preferably is recycled to the reactor by opening valve 43 in line 44 which joins line 45, leading to line 22.

Products, substantially hydrogen-free, including converted hydrocarbons, normally gaseous hydrocarbons which may have been formed during the reaction and also hydrogen halide if an activator was used are withdrawn from flash drum 38 through line 46 and directed to hydrogen chloride stripper 47, wherein the activator is substantially removed from the hydrocarbon products. The hydrogen chloride passes overhead through line 48 and may be discarded by opening valve 49 in line 50, but is preferably returned to the reaction system by opening valve 51 in line 52, which joins line 19 prior to pump 17. If impure hydrogen was used, the system must be purged of inert gases either intermittently or continuously which can be accomplished for example through valve 41 and line 42.

A varient of the above described procedure which is often advantageous is carried out by reducing the pressure in separator 29 thereby causing a gaseous phase to form therein consisting primarily of hydrogen, hydrogen halide and normally gaseous paraffins. This mixture of gases can be withdrawn by opening valve 53 in line 54 and can be recycled to the isomerization reaction vessel by opening valve 55 in line 45 and valve 56 in line 57, which joins line 22, or by opening valve 58 in line 59 which joins line 60, valve 56 being closed. Pump 61 in line 60 aids in increasing the pressure on the products in line 60 to the desired reaction pressure. Alternately the overhead products from separator 29 can be discarded by opening valve 62 in line 63.

In the event that the latter procedure of operating separator 29 is employed, it will not be necessary to direct the products from the separator through the hydrogen flash drum and hydrogen chloride stripper, so that valve 39 is closed and valve 64 in line 65 which leads to line 66 is open. If, however, the hydrogen and hydrogen chloride have been removed in the stripper system described, the products free of hydrogen chloride and hydrogen are withdrawn from hydrogen chloride stripper 47 via line 67 and directed to line 66. The products from either source are preferably caustic washed to remove any acidic material which may remain occluded therein, which washing may be carried out in caustic washer 68, caustic entering through line 69 and being mixed therein with the products from line 66. The spent caustic is withdrawn through line 70 while the acid-free products pass overhead through line 71 and are water washed free of caustic in washer 72, water entering from line 73 and being discharged through line 74.

The neutral product, which may or may not contain normally gaseous paraffins, passes overhead from water washer 72 through line 75 to fractionator 76 which is a super-fractionator for the removal of neo-hexane and lighter products. Fractionator 76 is maintained under conditions of temperature and pressure such that the overhead comprises substantially all of the neohexane and lighter hydrocarbons including normally gaseous hydrocarbons.

It is usually desirable to separate a fraction consisting predominantly of methyl pentanes and/or normal hexane and withdraw it as a side stream through line 77, for recycle via line 69 to feed line 11 and further conversion to neohexane. Hydrocarbons heavier than hexane are withdrawn from fractionator 76 through line 78 and may be discarded by opening valve 79 in line 80 or recycled to feed line 11 by opening valve 81 in line 82 having pump 83 therein. If desirable, the hexane side stream can be omitted and all of the hydrocarbons higher boiling than neohexane can be withdrawn through line 78 and returned to the reaction vessel.

Neohexane and lighter hydrocarbons pass overhead from fractionator 76 through line 84 having a cooler 85 therein to reflux drum 86 wherein they are condensed to liquid form. The cooled liquids are withdrawn through line 87 and a part may be recycled to fractionator 76 to act as reflux by opening valve 88 in line 89, the remainder being directed to fractionator 90 by opening valve 91 in line 92 which joins line 93, leading thereto.

In fractionator 90 hydrocarbons lower boiling than neohexane pass overhead through line 94 and cooler 95 to reflux drum 96, the cooled liquids being withdrawn therefrom through line 97. A part can be recycled to act as reflux by opening valve 98 in line 99 leading to the upper portion of fractionator 90, while the remainder, which will contain considerable quantities of isopentane as well as other hydrocarbons, is withdrawn by opening valve 100 in line 101. The product from reflux drum 96 can be further fractionated (by means not shown) into a fraction comprising predominantly isopentane and a fraction comprising normally gaseous hydrocarbons, including normal and/or isobutane, either or both of which can be used for blending with fuels deficient in light ends to improve the volatility thereof or the isopentane can be added to the fuels while the isobutane or normal butane is recycled (by means not shown) to the isomerization system to suppress the formation of further quantities of normal gaseous hydrocarbons. The neohexane which will be substantially pure neohexane but may contain minor amounts of cyclopentane and 2,3-dimethyl butane will have an octane number of about 95 CFR-M and a Reid vapor phase of about 10 pounds per square inch. The boiling range of neohexane will be within the range of from about 115° F. to about 130° F., preferably about 120° F. to about 125° F. The neohexane fraction is withdrawn from fractionator 90 through line 102 and can be withdrawn from the system for use as an aviation fuel or blended with other high octane number hydrocarbons of varying boiling range to yield a balanced gasoline of high octane number by opening valve 103 in line 104.

A variation in the fractionation system can be obtained by withdrawing from fractionator 76 through line 78 a fraction containing the neohexane plus heavier hydrocarbons in which event the lighter hydrocarbons passing overhead through line 84 will be discarded or otherwise used by opening valve 105 in line 106. The neohexane and heavier hydrocarbons are directed to fractionator 90 by opening valve 107 in line 108 which joins line 93, valve 91 in line 92 being closed, of course. In this system the neohexane will pass overhead from fractionator 90 through line 94 and will be recovered from line 101 while hydrocarbons heavier than neohexane are withdrawn from the base of fractionator 90 through line 102 and can be recycled to the system by opening valve 109 in line 110, which joins line 82. This method of fractionation is particularly applicable in those cases where the normally gaseous hydrocarbons have been taken overhead from separator 29 so that there is not an excessive amount of product to be passed through reflux drum 86.

As another example of our invention we will describe in connection with Figure 2 a current commercial neohexane unit for charging 1150 barrels per day of pentane-hexane charging stock and producing approximately 1000 barrels per day of pentane-hexane product of which the hexanes consist chiefly of neohexane. More precisely, the composition of the fresh charging stock will be:

| | Barrels per day |
|---|---|
| Pentanes (chiefly normal pentanes) | 333 |
| Cyclopentane | 15 |
| Branched hexanes (chiefly methyl pentanes) | 330 |
| Normal hexane | 354 |
| Benzene | 6 |
| Methyl cyclopentane | 94 |
| Cyclohexane | 11 |
| Total | 1143 |

In this embodiment a preheated debutanized paraffinic light virgin naphtha from line 111 enters light naphtha fractionator 112 at a temperature of about 217° F. and a pressure of about 35 pounds per square inch (gauge pressures in all instances). A reboiler 113 at the base of the fractionator maintains a bottom temperature of about 290° F. so that heptane and heavier products are withdrawn through line 114. Overhead is withdrawn from the top of the tower through line 115, through cooler 116, to receiver 117 and a sufficient amount of liquid is returned by pump 118 through line 119 to maintain the top temperature in the fractionator at about 170° F. Pentanes are withdrawn from the system through line 120 or if desired at least a part of this stream may be added to the charge tank 124 through lines 120a and 121.

An upper side stream of about 1150 barrels per day is withdrawn through line 121 at a temperature of about 208° F., this charge being characterized by an A. P. I. gravity of about 81.8 degrees, and having the approximate composition hereinabove set forth for fresh charging stock. To this stream about 600 barrels per day of recycled material is returned through line 122, the recycled fraction having an A. P. I. gravity of about 80 degrees. The composition of this recycled stream will be substantially as follows:

| | Barrels per day |
|---|---|
| Neohexane | 13 |
| 2-Methylpentane and diisopropyl | 286 |
| 3-Methylpentane | 135 |
| Normal hexane | 139 |
| Benzene | 1 |
| Methyl cyclopentane | 32 |
| Cyclohexane | 1 |
| Total | 607 |

The resulting 1750 barrels per day is cooled from about 182° F. to about 90° F. in cooler 123 and introduced into charge tank 124. Charge is passed in this tank by pump 125 through calcium chloride drying tower 126 and thence through a second filter 127 after which it is introduced at the top of hydrogen chloride absorber tower 128. This tower operates at a pressure of about 285 pounds per square inch with a top temperature of about 80 to 90° F. and a bottom temperature of approximately 110° F. Hydrogen chloride containing gases are introduced at the base of the tower through line 129 and unabsorbed gases are vented from its top through line 130. These vented gases are preferably scrubbed with a spent caustic from the system and then introduced into a fuel gas line.

The charging stock solution withdrawn from the tower through line 131 to receiver 132 is vented by line 133 to line 129. The charging stock in receiver 132 may contain about 2 to 20, for example 5 to 6% of hydrogen chloride and it may be at a temperature of 110 degrees and a pressure of 285 pounds per square inch. Such solution is withdrawn through line 134 and passed by pump 135 through heat exchanger 136 and heater 136′, then introduced at a temperature of approximately 300° F. at a low point in tower-type reactor 137. This reactor may be about 4 feet inside diameter by about 20 feet high and may be lined with glass or other non-corrosive material. It is operated under a pressure of about 850 pounds per square inch. Hydrogen is introduced through line 138 at the rate of about 180 cubic feet per barrel of stock charged. Liquid complex catalyst may be introduced through line 139 either continuously or from time to time and spent catalyst may be withdrawn through line 140. A column of this liquid aluminum chloride-hydrocarbon complex is maintained in said tower at a height of about 15 to 18 feet and this column is relatively stationary since the amount of complex introduced and withdrawn is very small indeed as compared to the amount of charging stock passing therethrough. The space velocity may be of the order of about 1.4 volumes of liquid charging stock per hour per volume of complex in the reactor (i. e. based on charging stock introduced through line 121) with a single reactor and 0.7 volume of liquid charging stock per hour per volume of complex in a system having two reactors as herein described. The charging stock liquid is intimately dispersed in the complex at the base of the column in tower 137; it passes upwardly as a dispersed phase in the column of complex and separates out of the column of complex in the upper section of the tower from which the product stream is withdrawn through line 141 and cooler 142 to reactor 143 which is another tower-type reactor of the same size as reactor 137.

Reactor 143 may be operated at a temperature of about 200° F. but otherwise its conditions will be the same as for reactor 137. Make-up aluminum chloride is introduced through line 144 in amounts required to maintain the catalyst activity within the defined range, i. e. to keep its aluminum chloride content above 50% but below 73% and preferably within the approximate range of 60 to 70%. Complex may be continuously or from time to time withdrawn through line 145 in order to maintain a substantially constant level of complex in the reactor.

The conversion products and gases leave the top of reactor 143 through line 146 and are introduced into hot settler 147 which is operated at substantially reaction temperature and pressure. Any complex which settles out in this settler is withdrawn through line 148. Hydrocarbon products and gases are withdrawn through line 149, reducing valve 150 and cooler 151 to settler 152 which is provided with a baffle or weir 153. Any complex which settles out in the cool settler 152 may be withdrawn through lines 154 and 155. Gases are withdrawn from settler 152, through line 156 which leads to line 129 and absorber 128. The remaining product stream is withdrawn through line 157 and introduced at the top of hydrogen chloride stripper 158 which operates at a pressure of about 285 pounds per square inch and in which a bottom temperature of about 355° F. is maintained by heating means 159. Hydrogen chloride together with small amounts of hydrogen, methane, ethane, etc., are removed through line 160 and returned via lines 156 and 129 to absorber 128. Make-up hydrogen chloride is introduced through line 161 in amounts of about 53 pounds per hour. This hydrogen chloride can be obtained in any suitable manner such as by burning hydrogen with chlorine or by contacting aqueous hydrogen chloride with concentrated sulfuric acid and at least a part of this hydrogen chloride may be obtained by treating spent complex with sulfuric acid.

The product stream leaves the base of stripper 158 through line 162 and it then passes through heat exchanger 136 and cooler 163 to mixer 164 wherein it is mixed with fresh 20 weight percent caustic solution introduced through line 165, the amount of fresh caustic required being approximately 320 pounds per hour. The mixture then passes through line 166 to settler 167 which operates at about 135 pounds pressure and 100° F. About 18 barrels per day of caustic solution is thus charged to the system through line 165 and about 470 barrels per day of caustic is recycled through line 168. A part of the used caustic from line 168 may be used to scrub tail gases from line 130 and a part of the used caustic may be continuously withdrawn from the system through line 169.

The product stream passes from settler 167 through line 170 to mixer 171 where it meets water introduced through line 172, the mixture being passed to water settler 173 operating at about 115 pounds pressure and 100° F. The wash water is withdrawn through line 174 and the washed product passes through line 175 through heat exchanger 176 to debutanizer tower 177 which operates at about 90 pounds pressure with a bottom temperature of about 265° F. maintained by heating means 178. Butane and lighter products are taken overhead through line 179 and cooler 180 to receiver 181 from which sufficient condensate is returned to the tower by pump 182 and line 183 to maintain a tower top temperature of about 160° F. The remainder of the butane and lighter products are withdrawn through line 184.

Separate towers may be employed for removing normal pentane and isopentane respectively and the normal pentane may be recycled to the system. When the neohexane is to be employed as an aviation fuel or blending stock and particularly when only a small amount of pentanes are present the pentanes (chiefly isopentane) may be left with the neohexane product. Tower 177 may be operated to remove pentanes as well as butanes when an isopentane-free neohexane is desired.

The stream of hexanes and heavier products are withdrawn from the base of debutanizer 177 through line 185 to heat exchanger 176 and are introduced into hexane tower 186 which may operate at a pressure of about 50 pounds per square inch with a bottom temperature of about 262° F. maintained by heating means 187. The neohexane product stream is taken overhead through line 188 and cooler 189 to receiver 190 from which a sufficient amount of liquid condensate is returned by pump 191 through line 192 to maintain a tower top temperature of about 217° F. The remaining neohexane product stream amounting to approximately 1000 barrels per day is withdrawn to storage through line 193. The neohexane stream in this particular example includes the pentanes as well as the hexanes and the product composition may be substantially as follows:

| | Barrels per day |
|---|---|
| Isobutane | 6 |
| Normal butane | 2 |
| Isopentane | 268 |
| Normal pentane | 90 |
| Cyclopentane | 8 |
| Neohexane | 318 |
| Diisopropyl and 2-methyl pentane | 253 |
| 3-Methyl pentane | 51 |
| Normal hexane | 8 |
| Total | 1004 |

It will be noted that neohexane consists upwards of 50% of the total hexanes in this stream and that of the pentane associated with the neohexane stream 75% is isopentane.

The bulk of the methyl pentanes, a normal hexane and heavier hydrocarbons leave the base of tower 186 through line 194 and are introduced into heptane tower 195 which operates at about 12 pounds pressure with a bottom temperature of about 213° F. maintained by heating means 196. Most of the products higher boiling than normal hexane are removed from the bottom of tower 195 through line 197. About 96 barrels per day of a 61.3 degree A. P. I. gravity product is withdrawn at this point. Methyl pentanes, normal hexane and any naphthenes within this approximate boiling range are taken overhead through line 198 and cooler 199 to receiver 200, enough of the condensate being returned by pump 201 and line 202 to maintain a tower top temperature of about 176° F. The remainder of the methyl pentane-hexane stream is recycled by line 122 for admixture with incoming charging stock in line 121 as hereinabove described.

Of approximately 725 barrels per day of hydrocarbons recycled through line 122 about 600 barrels are returned to line 121 and the remaining approximately 125 barrels per day are withdrawn through line 203 through cooler 204 for the preparation of make-up catalyst in slurry tank 205. Aluminum chloride powder is introduced into this make-up tank at the rate of approximately 2500 pounds per day. A slurry is prepared in tank 205 by circulating pump 206 and slurry is withdrawn from the system by pump 207 and introduced through line 144 to reactor 143. Complex from line 145 is usually introduced by pump 208 in line 209 to line 139 for introduction into reactor 137. Complex may be withdrawn from lines 210 and 140 to line 211 and thence to complex storage tank 212. Provision is usually made for blanketing the complex in storage tank 212 with an inert gas and for returning complex thus stored back to either of the reactors. About 3300 pounds per day of spent complex may be withdrawn from the system through line 213.

While we have described the introduction of make-up catalyst as a slurry in a portion of the recycled stream it should be understood that other methods of maintaining catalyst activity may be employed. A portion of the complex may be withdrawn from either or both towers, made into a paste with make-up aluminum chloride and reinjected into the reactor or reactors. Spent complex may be hydrogenated to eliminate a portion of the hydrocarbon associated therewith and in this manner its aluminum chloride content may be brought back to the desired range of 50 to 73% or preferably 60 to 70%. Also complex from this system may be employed in other systems for effecting isomerization of other hydrocarbons or for effecting such reactions as alkylation, polymerization, etc.

In the above specific example the recycling rate was just sufficient to produce a product stream of which the hexanes consisted chiefly of neohexane. By increasing the amount of recycled material and employing closer fractionation (or super-fractionation) it is possible to produce neohexane of any desired degree of purity. Thus with a recycle rate of less than 1:1 the hexane products may contain upwards of 50% neohexane. With very close fractionation and a charging stock containing less than 15% naphthenes we can produce a product consisting of about 80 to 90% neohexane with a 2:1 recycle ratio. With recycle ratios as high as 3:1 and with reasonably close fractionation and low naphthene contents, a neohexane of upwards of 90% purity may be produced. For aviation motor fuels and blending stocks, however, such high degrees of purity are usually not required. Diisopropyl and cyclopentane are both valuable aviation fuel components and may well constitute a part of the neohexane product stream. Likewise isopentane is a valuable component in motor fuels and as in the case of the example hereinabove set forth the pentanes may likewise be left in the neohexane stream.

The equilibrium distribution of pentanes and hexanes at various temperatures have been determined experimentally and are substantially as follows:

| Temperature | B. P., °F. | Liquid Vol. Per Cent | | | | |
|---|---|---|---|---|---|---|
| | | 212° F. | 250° F. | 300° F. | 350° F. | 400° F. |
| Pentanes: | | | | | | |
| Isopentane | 82 | 85 | 82 | 78 | 75 | 71 |
| n-Pentane | 97 | 15 | 18 | 22 | 25 | 29 |
| | | 100 | 100 | 100 | 100 | 100 |
| Hexanes: | | | | | | |
| Neohexane | 122 | 38 | 33 | 28 | 24 | 21 |
| 2,3-Dimethylbutane | 136 | 10 | 9 | 9 | 9 | 9 |
| 2-Methylpentane | 141 | 28 | 32 | 34 | 36 | 36 |
| 3-Methylpentane | 146 | 13 | 14 | 15 | 16 | 17 |
| n-Hexane | 156 | 11 | 12 | 14 | 15 | 17 |
| | | 100 | 100 | 100 | 100 | 100 |

Such equilibrium distribution cannot of course be obtained in ordinary commercial operations and in such operations the reaction temperature must be selected by balancing reaction rate, contact time, catalyst life, and other considerations as well as equilibrium. From an equilibrium standpoint lower temperature favors the production of branched-chain hydrocarbons but lower temperature also decreases the reaction rate and the degree of approach toward equilibrium. We prefer generally to employ reaction temperatures within the approximate range of 200 to 300° F. and while we have described 300 degree and 200 degree as the temperatures in our first and second reactors it should be understood that the first tower may operate at 275 and the second at either 250 or 225° F. The approach to equilibrium also depends to some extent on the naphthenic and aromatic content of the charge to the reactor. Large amounts of these compounds retard isomerization but a small amount of these compounds is essential to prevent excessive cracking.

Results obtainable in continuous operations may be predicated on batch operations. A series of runs was made on a sample of light virgin naphtha boiling between 110° F. and 153° F. (A. S. T. M.) and having an octane number of 67.5 (CFR-M) which contained approximately 35% pentanes and 65% hexanes. The runs were carried out at approximately 330° F. and an initial hydrogen pressure of about 600 pounds per square inch, using about 10.8% by weight of aluminum chloride, based on the naphtha and employing hydrogen chloride as an activator and a contact time of from 5 to 60 minutes. The same charge of catalyst was used for the entire series, longer contact times being used as the catalyst became spent. A composite sample of 81 CFR-M product from this process was fractionated on a column having about 50 theoretical plates, giving the following analysis:

| | Vol. per cent |
|---|---|
| Isobutane | 1.8 |
| Isopentane | 30.3 |
| n-Pentane | 9.6 |
| Cyclopentane | 2.6 |
| Neohexane | 13.2 |
| 2,3-dimethylbutane | 1.9 |
| 2-methylpentane | 21.2 |
| 3-methylpentane | 3.3 |
| n-Hexane | 7.4 |
| Bottoms | 3.7 |

The fraction boiling from about 110 to about 130° F. had an octane number (CFR-M) above 90 and an extraordinarily high blending value.

*Example 1*

A run was made using a special "hexane" cut which was neohexane-free, with an initial boiling point of 138° F., 50% off at 149° F. and 90% off at 150° F. This special naphtha had an A. P. I. gravity of 78.7° and an octane number of 61.8 (CFR-M). The conditions employed were 10.8% AlCl₃, 3.0% HCl, an initial hydrogen pressure of 600 pounds per square inch, a temperature of 330° F., and a contact time of 10 minutes. The neohexane produced on a once-through basis was 20.0% by volume based on a butane-free product.

*Example 2*

A run was made on neohexane-free cycle stock from Example 1. The product from the previous run was distilled neohexane-free and the bottoms taken as cycle stock. The cycle stock was treated under conditions similar to those employed in the previous run, viz. 10.8% AlCl₃, 3.1% HCl, an initial hydrogen pressure of 600 pounds per square inch, a temperature of 320° F., and a contact time of 7 minutes. The product again contained 20% by volume of neohexane, based on a butane-free product.

*Example 3*

A run was made on "hexane" cut of the type used in Example 1, with the addition of isobutane as a buffer. The run was carried out at 328° F. using an initial hydrogen pressure of 600 pounds per square inch, and a total pressure of 900 pounds per square inch. As a catalyst, a portion of the catalyst from Example 1 was employed in such amount that the AlCl₃ content of catalyst amounted to 10.8% by weight based on the feed. 3.6% (by weight) of HCl and 31.0% (by weight) of isobutane were added, and contact time was 1 hour. Under these conditions with "buffering" the volume per cent of neohexane based on the product increased to 23.5%.

It is obvious from Example 2 that the cycle stock isomerizes as readily as the fresh feed thereby permitting an ultimate yield of neohexane of about 70% to 80% or more by volume by fractionation and recycling. Moreover, in those cases where it is desired to obtain a maximum yield of neohexane at the expense of isobutane production this can be accomplished by buffering the reaction. In many cases, however, isobutane is a desirable by-product since it can be utilized advantageously in such reactions as alkylation. Economic factors will chiefly influence the commercial desirability of employing buffering or not.

Many modifications of our invention and of the apparatus shown herein for carrying out the same will be apparent to those skilled in the art and they will be able to supply numerous details not illustrated in the drawings, such as heat exchangers, provisions for fractionating tower control, etc. We do not desire to be limited to the specific modifications and examples used in illustrating our invention, but only by the appended claims wherein we have defined our invention.

We claim:

1. The method of producing neohexane which comprises contacting saturated hydrocarbon charging stock which contains no substantial amounts of paraffin hydrocarbons higher boiling than normal hexane and which consists chiefly of methyl pentanes and normal hexane with a liquid aluminum chloride paraffinic hydrocarbon complex catalyst in a continuous contacting zone, maintaining said zone at an isomerization temperature within the approximate range of 100° F. to 400° F. and under a pressure sufficient to maintain substantially liquid phase conversion conditions, adding hydrogen chloride to said zone in amounts sufficient for promoting isomerization said amounts being within the approximate range of .03 to 10% by weight based on charging stock, adding free hydrogen to said zone in amounts sufficient to prolong active catalyst life, adding make-up aluminum chloride to said zone, maintaining a time of contact in said zone sufficient for effecting substantial conversion of said methyl pentanes and normal hexane to more highly branched chain hexanes including neohexane, withdrawing a product stream together with at least a part of the catalyst from the contacting zone to a separating zone, separating catalyst from products leaving said separating zone, introducing products from said separating zone to a hydrogen chloride stripping zone, removing gases including hydrogen chloride from the upper part of said stripping zone, neutralizing and washing products removed from the lower part of said stripping zone, fractionating said washed products to obtain a fraction lighter than neohexane, a neohexane fraction, a fraction consisting chiefly of methyl pentanes and a heavier fraction and recycling to the contacting zone the fraction consisting chiefly of methyl pentanes.

2. The method of producing an aviation blending stock consisting essentially of C₅ hydrocarbons predominating in isopentane and C₆ hydrocarbons predominating in neohexane, which method comprises contacting a light paraffinic virgin naphtha rich in C₅ and C₆ paraffins, but which contains no substantial amounts of paraffins higher boiling than normal hexane, with an active liquid aluminum chloride hydrocarbon complex in a reaction zone at a temperature within the approximate range of 100 to 400° F., at a pressure within the approximate range of 100 to 1000 pounds per square inch in the presence of added hydrogen chloride in amounts within the approximate range of 2 to 20% by weight based on naphtha charged and in the presence of added hydrogen in amounts within the approximate range of 50 to 300 cubic feet per barrel of naphtha charge, using a space velocity within the approximate range of .2 to 4 volumes of fresh charge per hour per volume of active complex in the reaction zone, separating catalyst, activator and gases from the product stream which leaves said reaction zone, fractionating said product stream to obtain a debutanized aviation blending stock consisting essentially of C₅ hydrocarbons predominating in isopentane and C₆ hydrocarbons predominating in neohexane, and to also obtain a cycle stock predominating in methyl pentanes and substantially free from hydrocarbons higher boiling than heptane, and recycling said cycle stock to said conversion zone.

3. A process for the production of neohexane which comprises fractionating a straight run naphtha to obtain a hexane fraction which is substantially free from heptanes and higher boiling hydrocarbons, contacting said hexane fraction with an aluminum chloride isomerization catalyst in the presence of added hydrogen chloride and in the presence of a substantial amount of added free hydrogen under conditions for effecting isomerization of hexanes in said hexane fraction, fractionating the hydrocarbons from the contacting step to obtain at least three fractions: a neohexane fraction, an intermediate fraction of the methylpentane to normal hexane boiling range and a higher boiling residual fraction, recycling said intermediate fraction to said contacting step and withdrawing said residual fraction from the system.

4. The method of claim 3 in which the hydrocarbons charged to the contacting step boil chiefly within the approximate range of about 135 to about 155° F. and wherein the contacting is effected at a temperature within the approximate range of about 160 to 300° F.

5. A process for the production of a high octane number gasoline which comprises contacting normally liquid paraffinic hydrocarbons of low octane number boiling chiefly within the range of 90° F. to 158° F. and containing large amounts of single branched and straight chain hexanes, but no substantial amounts of double branched chain hydrocarbons and no substantial amounts of paraffinic hydrocarbons higher boiling than normal hexane, in the presence of a hydrogen halide promoted aluminum halide catalyst effective for converting said hexanes to more highly branched chain hexanes in a reaction zone at a temperature in the range of about 100° F. to about 400° F. under a hydrogen pressure in the range of about 50 to about 3000 pounds per square inch, separating catalyst material and hydrogen halide from hydrocarbon reaction products, then separating said products into at least one fraction lower boiling than neohexane, a fraction predominating in neohexane, a fraction predominating in methyl pentanes and a higher boiling fraction and recycling said fraction predominating in methyl pentanes to said contacting step.

6. A process for the production of high octane number gasoline from a substantially saturated normally liquid hydrocarbon fraction boiling within the range of about 30° F. to about 180° F., containing naphthenes, and consisting predominantly of paraffinic hydrocarbons including single branched chain and straight chain hexanes but no substantial amounts of double branched chain paraffins, which process comprises subjecting said fraction to the action of a hydrogen halide promoted aluminum halide catalyst effective in converting straight chain and single branched chain hexanes into more highly branched chain hexanes in a reaction zone maintained at isomerization temperature and pressure in the presence of added hydrogen, separating hydrogen halide and catalyst material from the hydrocarbon reaction products, then fractionating said products into at least one fraction containing hydrocarbons lower boiling than neohexane, a fraction predominating in neohexane, a fraction composed predominantly of methyl pentanes and a higher boiling fraction and returning at least a part of said fraction composed predominantly of methyl pentanes together with any naphthenes which it may contain to said reaction zone for further conversion.

7. A process for the production of neohexane which comprises contacting a virgin naphtha fraction which is substantially free from heptanes and heavier hydrocarbons and which contains large amounts of methyl pentanes and normal hexane but no substantial amounts of dimethyl butanes which process comprises contacting said naphtha fraction with an aluminum chloride isomerization catalyst in the presence of added hydrogen chloride in a reaction zone under isomerization conditions of temperature and pressure and in the presence of added hydrogen, employing a sufficient contact time in said reaction zone to effect the conversion of substantial amounts of normal hexane and methyl pentanes into more highly branched $C_6$ hydrocarbons including neohexane, separating catalyst material and hydrogen chloride from reaction products, then fractionating the reaction products to recover therefrom a plurality of fractions including a fraction predominating in neohexane and a fraction composed predominantly of methyl pentanes and recycling said last-named fraction to said reaction zone.

8. The method of producing neohexane which comprises contacting a saturated hydrocarbon fraction boiling chiefly within the range of 110° F. to 158° F. which fraction contains no substantial amounts of double branched chain paraffin and no substantial amounts of paraffin higher boiling than normal hexane and which fraction consists chiefly of methyl pentanes and normal hexane in the presence of a halide isomerization catalyst in a continuous contacting zone, maintaining said zone at isomerization temperature and pressure and effecting isomerization in the presence of added hydrogen, employing a time of contact in the contacting zone sufficient for effecting substantial conversion of normal hexane and methyl pentanes into more highly branched chain hexanes including neohexane, separating catalyst material from products leaving the contacting zone and fractionating said products to obtain a plurality of fractions including a fraction predominating in neohexane and a fraction predominating in methyl pentanes and recycling to the contacting zone at least a part of the fraction predominating in methyl pentanes.

9. A process for the production of neohexane which comprises continuously introducing into a conversion zone a charging stock consisting essentially of normally liquid paraffinic hydrocarbons boiling chiefly within the range of 90° F. to 158° F. and containing large amounts of single branched and straight chain hexanes, substantially less than 5% aromatics, substantially less than 20% naphthenes, no substantial amounts of double branched chain hydrocarbons and no substantial amounts of paraffinic hydrocarbons higher boiling then normal hexane, contacting said charging stock in said conversion zone in the presence of a halide isomerization catalyst in the presence of added free hydrogen for a time of contact sufficient for effecting substantial conversion of normal hexane and methyl pentanes into more highly branched chain hexanes including neohexane, separating hydrogen and catalyst material from products leaving the conversion zone, fractionating said products to obtain a plurality of fractions including a fraction predominating in neohexane, a fraction predominating in methyl pentanes and a highest boiling fraction, charging at least a portion of the fraction predominating in methyl pentanes to the conversion zone, and removing from the process the fraction predominating in neohexane and said highest boiling fraction.

10. The process of claim 9 wherein the catalyst is an aluminum chloride catalyst promoted by hydrogen chloride and wherein the conversion zone is maintained at a temperature within the range of about 100° F. to 400° F. under a hydrogen pressure in the range of about 50 to about 3000 pounds per square inch.

BERNARD L. EVERING.
EDMOND L. D'OUVILLE.

REFERENCES CITED

The following references are of record in the file of this patent:

UNITED STATES PATENTS

| Number | Name | Date |
| --- | --- | --- |
| 2,278,934 | Lee | Apr. 7, 1942 |
| 2,335,863 | Grosse | Dec. 14, 1943 |
| 2,358,311 | Block et al. | Sept. 19, 1944 |
| 2,373,295 | Cramer et al. | Apr. 10, 1945 |
| 2,373,674 | Crawford et al. | Apr. 17, 1945 |
| 2,381,434 | Burk | Aug. 7, 1945 |
| 2,413,691 | Crawford et al. | Jan. 7, 1947 |

FOREIGN PATENTS

| Number | Country | Date |
| --- | --- | --- |
| 52,359 | Netherlands | Apr. 15, 1942 |
| 24,044 | India | Aug. 23, 1937 |
| 375,753 | Italy | Oct. 23, 1939 |

(Other references on following page)

OTHER REFERENCES

Petrov et al., The Oil and Gas Journal, Feb. 2, 1939, pages 42 and 45; also in Berichte, vol. 68, 1-5 (1935); both in 260-683.5.

Forziati et al., Proc. 24th Annual Meeting A. P. I., vol. 24 (III), 34-38 (1943).

Schuit et al., Rec. Trav. Chim., vol. 59, 793-810 (1940).

Moldavskii et al., Jour. Gen. Chem. (USSR), vol. 5, Ser. A, 1791-7 (1935), Trans. in 260-683.5; (10 pages).